United States Patent
Tsang

(10) Patent No.: US 6,656,387 B2
(45) Date of Patent: Dec. 2, 2003

(54) AMMONIA INJECTION FOR MINIMIZING WASTE WATER TREATMENT

(75) Inventor: Chih-Hao Mark Tsang, Irvine, CA (US)

(73) Assignee: Texaco Inc., San Ramon, CA (US)

( * ) Notice: Subject to any disclaimer, the term of this patent is extended or adjusted under 35 U.S.C. 154(b) by 17 days.

(21) Appl. No.: 09/949,779

(22) Filed: Sep. 10, 2001

(65) Prior Publication Data
US 2003/0047716 A1 Mar. 13, 2003

(51) Int. Cl.[7] .............................. B01D 21/01; C01B 3/02
(52) U.S. Cl. ..................... 252/373; 423/648.1; 210/724
(58) Field of Search ........................ 48/197 R; 210/724; 252/373; 423/648.1

(56) References Cited

U.S. PATENT DOCUMENTS

| 2,809,104 A | 10/1957 | Strasser et al. ............... 48/215 |
| 2,928,460 A | 3/1960 | Eastman et al. ............. 122/6.5 |
| 3,531,265 A * | 9/1970 | Dille ........................... 48/201 |
| 4,014,786 A | 3/1977 | Potter et al. ................... 48/211 |
| 4,159,238 A | 6/1979 | Schmid ....................... 208/418 |
| 4,369,054 A | 1/1983 | Shinholster, Jr. ............... 71/25 |
| 4,728,437 A * | 3/1988 | Gettert et al. ................ 210/710 |
| 4,828,715 A | 5/1989 | Sander et al. ............... 210/710 |
| 4,851,013 A | 7/1989 | Luke ........................... 48/203 |
| 4,854,942 A | 8/1989 | Denney et al. ............... 48/197 |
| 5,415,673 A | 5/1995 | Hilton et al. ................. 48/197 |
| 5,435,940 A | 7/1995 | Doering et al. ............. 252/373 |
| 5,958,240 A | 9/1999 | Hoel .......................... 210/608 |

* cited by examiner

Primary Examiner—Stanley S. Silverman
Assistant Examiner—Maribel Medina
(74) Attorney, Agent, or Firm—Josetta I. Jones

(57) ABSTRACT

In accordance with the present invention, a basic material, preferably ammonia, is injected into the stream of soot water leaving the gasification reactor prior to being processed in a filtration-type soot removal unit. The elevated pH of the soot water causes more metals to remain in the filter cake. Thus, the metals content of the grey water is reduced. More grey water can then be recycled back to the gasification unit, with less grey water being handled by the wastewater treatment unit.

4 Claims, 1 Drawing Sheet

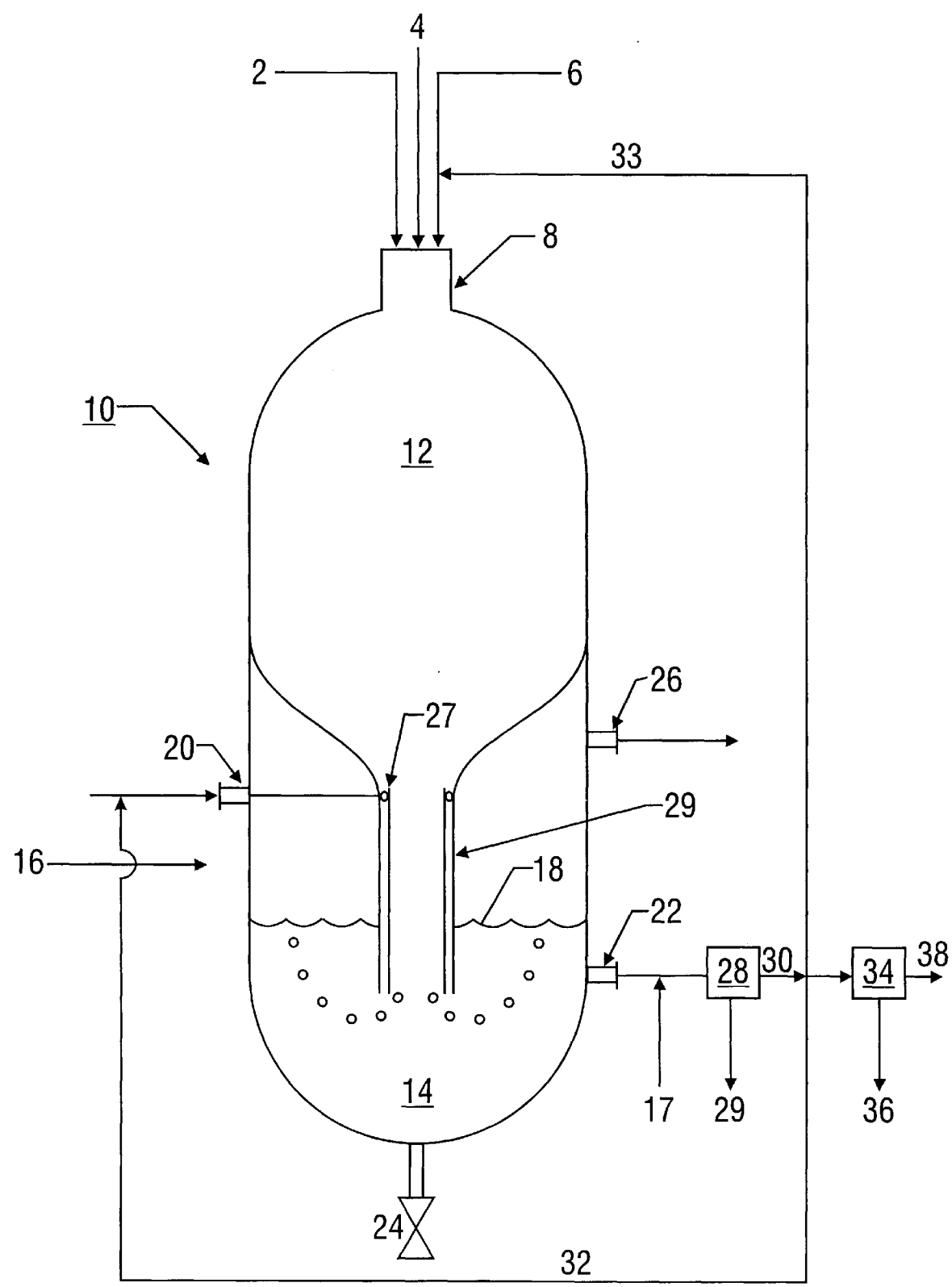

AMMONIA INJECTION FOR MINIMIZING WASTE WATER TREATMENT

BACKGROUND OF THE INVENTION

High pressure, high temperature gasification systems have been used to partially oxidize hydrocarbonaceous fuels to recover useful by-products or energy. The fuels can be admixed with water to form an aqueous feedstock that is fed to the reaction zone of a partial oxidation gasifier along with an oxygen containing gas and a temperature moderator.

Mixing the feed with water may not be necessary, given the composition and physical nature of the feedstock. Generally, solid carbonaceous fuels will need to be liquefied with oil or water prior to feeding to the gasifier. Liquid and gaseous hydrocarbonaceous fuels may be suitable for direct feed to the gasifier, but can be pre-treated for removal of any impurities that might be present in the feed.

The term liquid hydrocarbonaceous fuel as used herein to describe various suitable feedstocks is intended to include pumpable liquid hydrocarbon materials and pumpable liquid slurries of solid carbonaceous materials, and mixtures thereof. In fact, any combustible carbon-containing liquid organic material, or slurries thereof may be included within the definition of the term "liquid hydrocarbonaceous." For example, there are pumpable slurries of solid carbonaceous fuels, liquid hydrocarbon fuel feedstocks, oxygenated hydrocarbonaceous organic materials, and mixtures thereof. Gaseous hydrocarbonaceous fuels may also be processed in the partial oxidation gasifier alone or along with liquid hydrocarbonaceous fuel.

The partial oxidation reaction is preferably carried out in a free-flow, unpacked non-catalytic gas generator, or gasifier at a temperature within the range of about 700° C. to about 2000° C., preferably about 1200° C. to about 1500° C. The gasifier operates at a pressure of about 2 to about 250 atmospheres, preferably about 10 to about 150 atmospheres, and most preferably about 20 to about 90 atmospheres. Under these conditions, about 95% to 99.99% of the hydrocarbonaceous feedstock can be converted to a synthesis gas containing carbon monoxide and hydrogen, also referred to as synthesis gas or syngas. Carbon dioxide and water are either formed or consumed via water gas shift reaction [$CO+H_2O \Leftrightarrow CO_2+H_2$] depending on the type of the moderator employed and operating conditions.

Water is further used as quench water to quench and cool the syngas. In a typical gasification reactor, the effluent gas passes out the bottom of the gasification reactor into a quench chamber. The effluent gas is cooled by passing through a pool of quench water. The quench water cools the syngas and scrubs particulate matter from the syngas, and is further used to convey particulate waste solids, such as ash and/or slag out of the gasifier. Generally, ash and/or slag is allowed to accumulate in the bottom of the quench chamber, and periodically that ash and/or slag is removed from the quench chamber using a lockhopper system. The syngas leaves the quench chamber through an outlet port above the level of the quench water. Quench water is continuously circulated in the quench chamber, being removed from the quench chamber as soot water, carbon water, or black water at an outlet port below the level of the quench water.

Removal of particulate carbon from the soot water is commonly done in a soot recovery unit. One common process is solvent extraction in a one or two-stage decanter, such as shown and described in U.S. Pat. No. 4,014,786, or in a traditional naphtha extraction unit. These carbon extraction systems are complex and have high capital costs due to the large number of equipment items, cost of solvent, and high energy costs. The carbon can also be removed from the soot water by using a conventional liquid-solids separator such as a filter press, hydrocyclone, or centrifuge. For example, by means of a filter press, filter cake having a solids content of 10 to 60 wt. % may be produced along with a grey water filtrate. The filter cake is usually disposed of, and preferably a portion of the grey water is recycled back to the gasification reactor for use as quench water. Such a process employing a filter press is shown and described in U.S. Pat. No. 5,415,673.

Even after having the solids removed, the composition of the grey water is fairly complex. This water can contain chlorides, ammonium salts, and other environmentally harmful dissolved materials such as sulfide and cyanide. Heavy metals such as antimony, cadmium, chromium, cobalt, lead, molybdenum, nickel, strontium and zinc, are also remain in the grey water.

Because of this, after soot removal, the entire grey water stream cannot be recycled back to the gasification system because not all the impurities are removed in the soot recovery unit. Instead, a significant portion of the grey water must be treated in a wastewater treatment unit to remove these impurities from the grey water, so that the concentrations of these impurities do not build up in the recycled grey water stream. Some compounds found in the water, particularly the heavy metals, are very difficult to remove from the grey water. It is costly to treat large amounts of grey water with high metals concentrations. Thus, it would be desirable to develop a process that would minimize the metals content in the grey water so that more grey water could be recycled back to the gasification system, reducing the size of the wastewater treatment as it would have to handle less grey water.

SUMMARY OF THE INVENTION

In accordance with the present invention, a basic material, preferably ammonia, is injected into the stream of soot water leaving the gasification reactor prior to being processed in a filtration-type soot removal unit. The elevated pH of the soot water causes more metals to remain in the filter cake. Thus, the metals content of the grey water is reduced. More grey water can then be recycled back to the gasification unit, with less grey water being handled by the wastewater treatment unit. This advantageously increases the efficiency of the overall gasification process, and reduces the size and process costs of the wastewater treatment unit because there are less metals to be removed from the grey water.

BRIEF DESCRIPTION OF THE DRAWINGS

The FIGURE illustrates one embodiment of the present invention.

DESCRIPTION OF ILLUSTRATIVE EMBODIMENTS

In the instant invention, carbonaceous fuel is first obtained and prepared for feeding to a gasification reactor. Carbonaceous fuel is any solid, liquid, or gaseous combustible organic material that can be used as feedstock to a gasification process for syngas production. The feedstock for a gasification process is usually a hydrocarbonaceous material, that is, one or more materials, generally organic, that provides a source of hydrogen and carbon for the gasification reaction. The hydrocarbonaceous material can be in a gaseous, liquid or solid state, or in a combination as desired, for example, a solid-liquid composition in a fluidized state.

The feed preparation step may not be necessary, given the composition and physical nature of the feedstock. Generally, solid carbonaceous fuels will need to be liquefied with oil or water prior to feeding to the gasifier. Liquid and gaseous carbonaceous fuels may be suitable for direct feed to the gasifier, but can be pre-treated for removal of any impurities that might be present in the feed.

The term liquid hydrocarbonaceous fuel as used herein to describe various suitable feedstocks is intended to include pumpable liquid hydrocarbon materials, pumpable liquid slurries of solid carbonaceous materials, and mixtures thereof. For example, pumpable aqueous slurries of solid carbonaceous fuels are suitable feedstocks. In fact, virtually all combustible carbon-containing liquid organic material, or slurries thereof, may be included within the definition of the term "liquid hydrocarbonaceous." For example, there are:

(1) pumpable slurries of solid carbonaceous fuels, such as coal, particulate carbon, petroleum coke, concentrated sewer sludge, and mixtures thereof, in a vaporizable liquid carrier, such as water, liquid $CO_2$, liquid hydrocarbon fuel, and mixtures thereof;

(2) suitable liquid hydrocarbon fuels includes various materials, such as liquefied petroleum gas, petroleum distillates and residua, gasoline, naphtha, kerosene, crude petroleum, asphalt, gas oil, residual oil, tar sand oil and shale oil, coal derived oil, aromatic hydrocarbons (such as benzene, toluene, xylene fractions), coal tar, cycle gas oil from fluid-catalytic-cracking operations, furfural extract of coker gas oil, and mixtures thereof;

(3) also included within the definition of the term liquid hydrocarbonaceous are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof.

Gaseous hydrocarbonaceous fuels that may be processed in the partial oxidation gasifier alone or along with the liquid hydrocarbonaceous fuel includes vaporized liquid natural gas, refinery off-gas, $C_1$–$C_4$ hydrocarbonaceous gases, and waste carbon-containing gases from chemical processes.

After the feed preparation step, if used, the carbonaceous fuel is partially oxidized in a gasification reactor, or gasifier. In the gasifier, the carbonaceous fuel is reacted with a reactive free oxygen-containing gas. The term free-oxygen containing gas as used herein means air, oxygen-enriched air (greater than 21 mole % $O_2$) or substantially pure oxygen (greater than about 90% mole oxygen) with the remainder usually comprising $N_2$ and rare gases. Substantially pure oxygen is preferred, such as that is produced by an air separation unit (ASU). The partial oxidation of the hydrocarbonaceous material is usually completed in the presence of a temperature control moderator such as steam, in a gasification zone to obtain hot synthesis gas, or syngas. Synthesis gas and syngas can and are used interchangeably throughout this specification.

The need for a temperature moderator to control the temperature in the reaction zone of the gas generator depends in general on the carbon-to-hydrogen ratios of the feedstock and the oxygen content of the oxidant stream. A temperature moderator is commonly used with liquid hydrocarbon fuels and substantially pure oxygen. Water or steam is the preferred temperature moderator. Steam may be introduced as a temperature moderator in admixture with either or both reactant streams. Alternatively, the temperature moderator may be introduced into the reaction zone of the gas generator by way of a separate conduit in the feed injector. Other temperature moderators include $CO_2$-rich gas, nitrogen, and recycled syngas.

A gasification reactor generally comprises a reaction zone, made up of a vertical cylindrically shaped steel pressure vessel lined with refractory, and a quench chamber, such as is shown in U.S. Pat. No. 2,809,104, incorporated herein by reference. A feed injector, such as that shown in U.S. Pat. No. 2,928,460, incorporated herein by reference, may be used to introduce the feed streams into the reaction zone. In the reaction zone of a gasifier, the contents will commonly reach temperatures in the range of about 1,700° F. (927° C.) to 3,000° F. (1649° C.), and more typically in the range of about 2,000° F. (1093° C.) to 2,800° F. (1538° C.). Pressure will typically be in the range of about 1 atmospheres (101 kPa) to about 250 atmospheres (25331 kPa), and more typically in the range of about 15 atmospheres (1520 kPa) to about 150 atmospheres (15,199 kPa), and even more typically in the range of about 60 atmospheres (6080 kPa) to about 80 atmospheres (8106 kPa). See U.S. Pat. No. 3,945,942 describing a partial oxidation feed injector assembly. See U.S. Pat. No. 5,656,044 describing a method and an apparatus for the gasification of organic materials. See also U.S. Pat. Nos. 5,435,940, 4,851,013, and 4,159,238 describing a few of the many gasification processes known in the prior art. The entire disclosures of the above referenced patents are hereby incorporated by reference.

The hot gasification process product syngas comprises primarily carbon monoxide and hydrogen. Other materials often found in the syngas include hydrogen sulfide, carbon dioxide, ammonia, cyanides, and particulates in the form of carbon and trace metals. Ash and/or molten slag may also be present. The extent of the contaminants in the feed is determined by the type of feed and the particular gasification process utilized as well as the operating conditions. Depending on the composition after removal of the entrained particulate carbon and any ash and/or slag in the manner described below and with or without dewatering, the syngas stream may be employed as synthesis gas, reducing gas, or fuel gas.

As the syngas is discharged from the gasifier, it passes into the gasification quench chamber for cleaning. The turbulent condition in the quench drum, caused by large volumes of gases bubbling up through the water, helps the water to scrub much of the solids from the effluent gas. Large quantities of steam are generated within the quench vessel and saturate the syngas stream. While being cleaned, the syngas is simultaneously cooled in the quench drum. Advantageously, the fresh quench water used in the subject invention is deaerated grey water or condensate produced subsequently in the process. The syngas can optionally be subjected to further cooling and cleaning operations prior to its final use.

A pumpable aqueous dispersion is produced in the quench tank that substantially comprises quench water and particulate carbon containing solids. This carbon-water dispersion is referred to herein as soot water, carbon water, or black water, the terms being interchangeable. Depending on the composition of the gasifier fuel, a relatively small amount of ash may be present in the dispersion. Further, any unburned inorganic solids such as coarse ash and/or slag from solid fuels and any refractory from the gasifier may accumulate at the bottom of the quench tank. Periodically, this solid material, coarse ash and/or slag may be removed from the quench chamber by way of a lock-hopper. A separate stream of soot water is removed separately from the solid materials.

After being removed from the quench tank, the soot water can be pretreated in any number of ways known in the art prior to being sent to a filter press for separation of the soot from the water. Such a process is described in U.S. Pat. No. 5,415,673, incorporated herein by reference. In accordance with the present invention, a stream of basic material, such as calcium oxide or ammonia, preferably ammonia, is mixed with the soot water at a point prior to the filter press. Preferably, the amount of basic material added to the soot water increases the pH of the soot water, preferably to a pH of about 8 to about 12. This increased pH facilitates the removal of heavy metals from the soot water by increasing retention of those metals in the subsequently removed filter cake. Any basic material that, when added to the soot water, will raise the pH of the soot water is within the scope of this invention.

After the basic material injection, the soot water is introduced into a conventional liquid-solids separator such as a filter, hydrocyclone, or centrifuge, preferably a filter press. The two main products of the liquid-solids separator are the filter cake and the grey water filtrate. The filter cake may be burned as fuel or alternately used to recover the metals content, or can be discarded. The grey water filtrate may be stored in a grey water tank along with other process water of similar composition, where it can await further treatment by a wastewater treatment unit. Preferably a portion of the grey water filtrate is recycled back to the gasification reactor for use as quench water. Because of the increased pH of the soot water, the grey water filtrate contains less heavy metals, which minimizes the size of the downstream wastewater treatment unit by minimizing the amount of grey water that needs to be sent to that wastewater treatment unit.

Referring to the FIGURE, a typical gasification unit is shown incorporated with one embodiment of the present invention. Hydrocarbonaceous fuel, an oxygen containing gas, and a temperature moderator are fed through lines 2, 4 and 6, respectively, to gasification reactor 10 via feed injector 8. In the reaction section 12 of the gasification reactor 10 the feed streams react to form syngas. The syngas passes out the bottom of the reaction section 12 into a pool of quench water 14 in the quench chamber 16 of the gasification reactor 10. The pool of quench water 14 has a level 18 that is higher than the inlet of the syngas. The syngas bubbles through the quench water 14, and exits the quench chamber 16 through outlet port 26. Fresh quench water is fed to the quench chamber 16 through inlet port 20 into the quench ring 27, and is removed as soot water through outlet port 22. Ash and/or slag accumulates in the bottom of the quench chamber 16, and is periodically removed by opening valve 24 and sending the ash and/or slag to a lockhopper system (not shown).

After being removed from the quench chamber 16, the soot water mixed with ammonia 17 and sent to a soot recovery unit 28, preferably a filter press, for separation of soot from the water. Alternatively the soot water can be treated by other means known in the art before the soot recovery unit 28, either before or after the ammonia injection. The recovered soot/filter cake 29 contains a higher concentration of metals than typical prior art filter cake, and is preferably disposed of. A portion of the filtrate 30, now referred to as grey water, can be recycled back to the quench chamber of the gasifier for use as quench water via stream 32. The grey water can also be sent via stream 33 to the gasification reactor for use as a temperature modifier. Another portion of the grey water 30 is sent to wastewater treatment unit 34, where it is further treated for impurities removal and additional solids removal. Finally, a solids-containing waste stream 36 and treated water 38 are produced, the treated water 38 preferably being used as an additional quench water or temperature moderator source to the gasification unit.

EXAMPLE ONE

A test was run using a process similar to the one described and shown in the FIGURE, comparing the metals content in the leachate by leaching solids-containing waste stream (clarifier bottoms) with and without raising the pH. Note that this set of test data is not equivalent to the metals concentration in the filter cake, but is equivalent to the metals concentration in the filtrate from a liquid-solids separator such as a filter press. The results of this test are illustrated below:

TABLE 1

Leaching Test of Metals from Carbon Water Treatment Solids-Containing Waste Stream

| Sample pH | 7.5 (Normal) | 11 (Calcium Oxide Addition) |
|---|---|---|
| Metal Conc. In Leachate | wppm | wppm |
| Antimony | <0.01 | <0.01 |
| Cadmium | 23 | <0.05 |
| Chromium | <1 | <1 |
| Cobalt | 7 | <1 |
| Lead | 107 | 15 |
| Molybdenum | <0.04 | 1.73 |
| Nickel | 53 | <1 |
| Strontium | 1.8 | 6.3 |
| Zinc | 855 | 24 |

These results show that increasing the pH causes substantially lower metals concentration in the leachate, leaving more metals in the filter cake. This data confirms the proposition that increasing the pH by ammonia injection in the stream of soot water allows for the retention of more metals in the filter cake, thus reducing the metals in the grey water to be recycled or treated.

What is claimed is:

1. In a process in which carbonaceous fuel is partially oxidized in a gasification reactor by reacting the carbonaceous fuel with a reactive free oxygen containing gas to obtain synthesis gas, wherein the synthesis gas is cleaned in a quench chamber using quench water, the quench water being removed from the quench chamber as solids-containing soot water, and the soot water being subjected to a soot recovery unit so as to separate solids in the soot water from the soot water, the improvement comprising mixing a stream of basic material with the soot water prior to subjecting the soot water to the soot recovery unit to facilitate removal of heavy metals from the soot water, wherein the basic material is added in a sufficient amount to raise the pH of the soot water to between a pH of about 8 and a PH of about 12.

2. The process of claim 1, wherein the basic material is ammonia or calcium oxide.

3. The process of claim 1, wherein the soot recovery unit is selected from the group consisting of a filter press, hydrocyclone, and centrifuge.

4. The process of claim 3, wherein the soot recovery unit is a filter press.

* * * * *